United States Patent
Lee et al.

(10) Patent No.: US 11,921,923 B2
(45) Date of Patent: Mar. 5, 2024

(54) OSCILLATION REDUCTION IN HAPTIC VIBRATORS BY MINIMIZATION OF FEEDBACK ACCELERATION

(71) Applicant: Maxim Integrated Products, Inc., San Jose, CA (US)

(72) Inventors: Sangwon Lee, Pleasanton, CA (US); Vivek Prakash Nigam, Dublin, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 584 days.

(21) Appl. No.: 16/942,772

(22) Filed: Jul. 30, 2020

(65) Prior Publication Data

US 2021/0034158 A1   Feb. 4, 2021

Related U.S. Application Data

(60) Provisional application No. 62/880,500, filed on Jul. 30, 2019.

(51) Int. Cl.
| | |
|---|---|
| *G06F 3/01* | (2006.01) |
| *G05D 19/02* | (2006.01) |
| *G08B 6/00* | (2006.01) |

(52) U.S. Cl.
CPC ............ *G06F 3/016* (2013.01); *G05D 19/02* (2013.01); *G08B 6/00* (2013.01)

(58) Field of Classification Search
CPC ............ G06F 3/016; G08B 6/00; G05D 19/02
USPC ........................................ 340/68 R
See application file for complete search history.

(56) References Cited

U.S. PATENT DOCUMENTS

| | | | |
|---|---|---|---|
| 8,686,839 B2 | 4/2014 | Posamentier | |
| 10,304,298 B2 | 5/2019 | Shah et al. | |
| 10,332,367 B1* | 6/2019 | Benkreira | ............... G06F 21/44 |
| 2012/0249462 A1* | 10/2012 | Flanagan | ............... G06F 3/016 |
| | | | 340/407.1 |
| 2018/0183372 A1* | 6/2018 | Li | ........................... G06F 3/016 |
| 2019/0163277 A1* | 5/2019 | Kanai | ................... G06F 3/0416 |
| 2020/0026354 A1* | 1/2020 | Swindells | ............... G06F 3/016 |
| 2020/0218358 A1* | 7/2020 | Cruz Hernandez | .... G05D 19/02 |

(Continued)

OTHER PUBLICATIONS

Bishop Rock, LLC Technical Intelligence, MAXM-2077P Validity Search Report, Oscillation Reduction in Haptic Vibrators by Minimization of Feedback Acceleration, dated May 6, 2020, (24 pgs).

*Primary Examiner* — Jack K Wang
(74) *Attorney, Agent, or Firm* — North Weber & Baugh LLP; Michael North

(57) ABSTRACT

Described herein are embodiments for reducing haptic vibrations for electronic devices. Embodiments of an oscillation reduction scheme learned offline are disclosed for minimizing the acceleration for a haptic vibrator. A pattern and braking generation module outputs a pattern signal for amplification and then for driving the haptic vibrator. An accelerometer measures acceleration induced by vibration from the haptic vibrator. The pattern and braking generation module adjusts the pattern signal based on the measured acceleration to identify an optimal amplitude for a braking signal at each time frame. Such a closed-loop braking optimization process may be implemented to achieve an optimal or desired braking scheme for enhanced user haptic feedback.

20 Claims, 8 Drawing Sheets

(56) References Cited

U.S. PATENT DOCUMENTS

2020/0356173 A1* 11/2020 Bajaj .................. G06F 3/016
2021/0142629 A1* 5/2021 Karimi Eskandary ..................
B06B 1/0644

* cited by examiner

300

OSCILLATION REDUCTION IN HAPTIC VIBRATORS BY MINIMIZATION OF FEEDBACK ACCELERATION

CROSS REFERENCE TO RELATED APPLICATION

The application claims the benefit under 35 U.S.C. § 119(e) of Provisional Application Ser. No. 62/880,500, entitled "OSCILLATION REDUCTION IN HAPTIC VIBRATORS BY MINIMIZATION OF FEEDBACK ACCELERATION", filed on Jul. 30, 2019, and listing Sangwon Lee and Vivek Prakash Nigam as the inventors. The aforementioned patent document is incorporated by reference herein in its entirety.

BACKGROUND

A. Technical Field

The present invention relates generally to haptic management for electronic devices, especially to haptic vibration reduction for electronic devices.

B. Background of the Invention

Haptic vibrators enable touch feedback between a user and the haptic enabled electronic devices, which could include a smartphone, tablet or any other portable consumer electronic devices. The quality of such vibrations and the overall haptic experience depends heavily on patterns that drive the vibrators and how quickly the vibrations fade away once the pattern is removed.

The lingering of the vibrations (free oscillations) after the pattern is removed dilute the haptic experience. The free oscillation period may be decreased by applying some kinds of braking that stops the free oscillation. Such an active braking process is currently deployed in many electronic devices. However, those active braking patterns may be heuristic and may not be optimal for minimizing free oscillation or a desired oscillation diminishing pattern.

It would be desirable to have systems and methods decreasing vibration of haptic vibrators in a desired pattern for improved haptic experience.

SUMMARY OF THE INVENTION

Embodiments of the invention relate to systems and methods for vibration braking of haptic vibration for electronic devices.

Embodiments of a vibration braking optimization system are disclosed for haptic vibration control. The system provides a way to generate an optimized haptic driven signal offline for vibration braking to achieve quick free oscillation diminishment. The vibration braking optimization system may comprise a test apparatus or circuit incorporating a haptic vibrator and an accelerometer, an amplifier, and a pattern generator. The pattern generator incorporates a pattern and braking generation module and an acceleration analysis module. The pattern and braking generation module outputs a pattern signal to the amplifier, which generates a driven signal to drive the haptic vibrator. The accelerometer measures acceleration induced by vibration from the haptic vibrator and outputs an acceleration signal to the acceleration analysis module, which performs acceleration analysis based on the acceleration signal and outputs a feedback control signal to the pattern and braking generation module for adjusting the pattern signal. Such a closed-loop vibration braking optimization system may be operated in various processes to achieve an optimal vibration braking scheme for quickest free oscillation braking.

In one or more embodiments, a process for real-time braking pattern generation is disclosed. A pattern signal is used to cause a haptic vibrator to vibrate. After a desired period, a vibration braking is initialized at time frame M. At next time frame M+1, the amplitude, e.g. voltage, of the pattern signal is identified from a plurality of potential values between a minimum value $V_{min}$ and a maximum value $V_{max}$. In one or more embodiments, each potential value is tried given the pattern signal h(t) up to time frame M. Accelerations measured for each potential values are recorded and compared. Amplitude corresponding to the minimum vibration (parameterized as minimum acceleration) measured is selected as the amplitude for the time frame M+1. Afterwards, the braking pattern generation moves to next time frame M+2 and repeats the same procedures for potential value trial given the pattern signal h(t) up to time frame M+1, acceleration measurement and comparison, identification for selected amplitude for time frame M+2, until time frame M+N, where the minimum acceleration is below a threshold or as zero.

In one or more embodiments, after obtaining an optimized vibration braking pattern for a haptic vibrator, the braking pattern may be stored or loaded into a storage of an electronic device, within which the haptic vibrator is integrated.

One skilled in the art will recognize that embodiments of the vibration braking may be implemented in an electronic device in various configurations. One skilled in the art will further recognize that depending on application running, the electronic device may utilize the optimized vibration braking pattern, with various additional tunings, all of which may be useful in generating an enhanced user haptic feedback and should fall within the scope of the present invention.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

Figure 1:
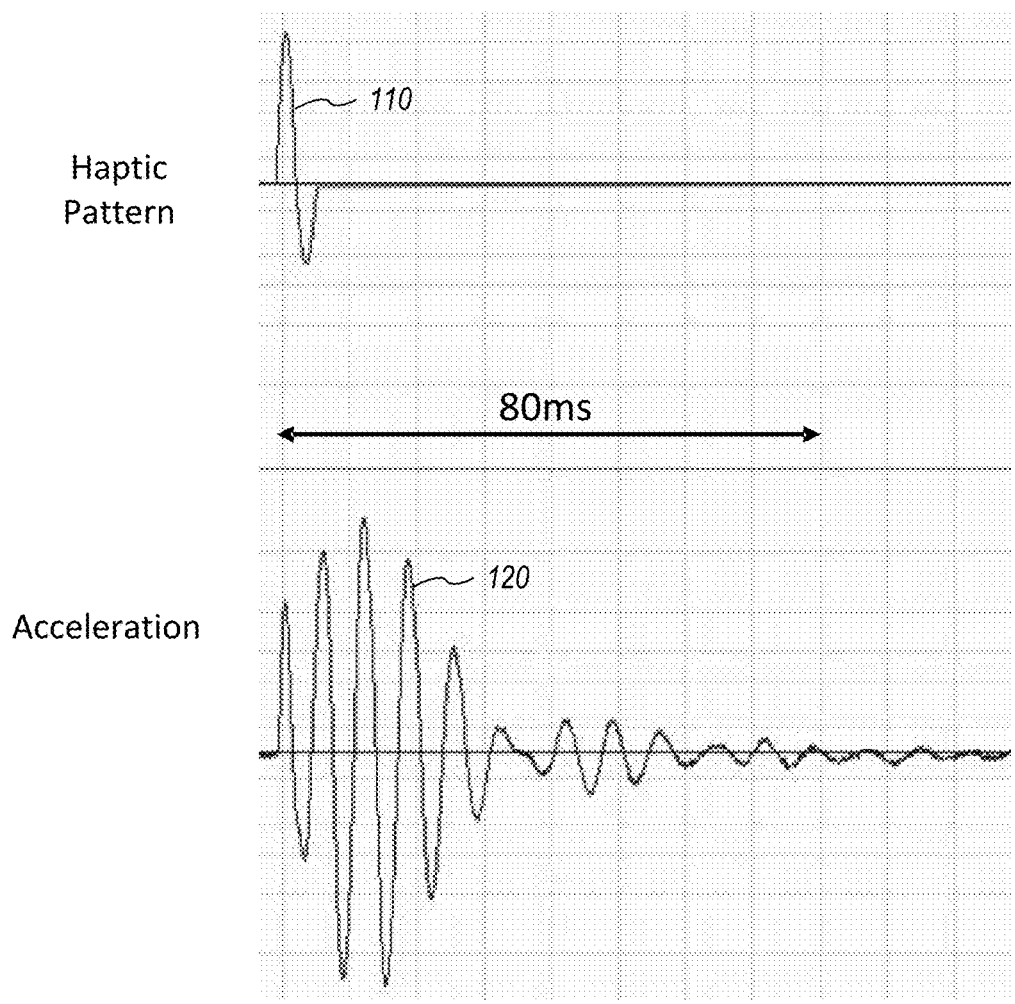
FIG. 1 depicts a prior art haptic driving signal without braking and an acceleration for a haptic vibrator driven by the haptic driving signal without braking.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

The use of certain terms in various places in the specification is for illustration and should not be construed as limiting. A function or resource is not limited to a single function or resource; usage of these terms may refer to a grouping of related functions or resources, which may be distributed or aggregated. The terms "include," "including," "comprise," and "comprising" shall be understood to be open terms and any lists the follow are examples and not meant to be limited to the listed items.

Various embodiments of the invention are used for vibration braking of haptic vibrators in electronic devices. Embodiments of a vibration braking scheme learned offline are disclosed for minimizing the acceleration for a haptic vibrator in a feedback manner. Depending on application in an electronic device, the vibration braking part in the haptic driven signal may be configured or tuned based on the vibration braking scheme learned offline for desired braking pattern.

As described herein a haptic vibrator may constitute any device, actuator or transducer configured to generate a vibration (e.g., a haptic vibration) in response to an electrical signal applied to the device, actuator or transducer. Haptic vibrators have been used widely in electronic devices, such as smartphones, etc., as a way to provide haptic feedback for enhanced user experience. Haptic vibrators may have different types, such as eccentric rotating mass (ERM) actuators, linear resonant actuators (LRAs), piezoelectric actuators. An ERM actuator uses an unbalanced weight attached to a motor shaft. As the shaft rotates, the spinning of this irregular mass causes the actuator and the attached device to shake. For LRA vibrators, a mass is moved in a reciprocal manner driven by an AC electrical signal via a magnetic voice coil, similar to motion transfer in a cone of a loudspeaker. LRAs are very efficient and allow more precise and complex vibrations for an improved experience. Unlike ERMs, the vibration oscillates linearly. Additionally, LRAs may decouple amplitude and frequency and thus are capable of amplitude adjusting without affecting frequency. Piezoelectric actuators may provide precise motions with less noise and in a smaller platform, but require relatively higher driven voltages compared to ERMs and LRAs.

The quality of such vibrations and the overall haptic experience depends heavily of patterns that drive the vibrators and how quickly the vibrations fade away once the pattern is removed. In certain situations, e.g. when receiving an amber alert, it is desirable that the vibrator in an electronic device keeps vibrating for relative long time. While in some other applications, it is desirable to stop the vibrator quickly after vibrating for a predetermined time or pattern. Without some "braking" mechanisms, the vibrator may still vibrate freely and possibly longer than a desired period, after a haptic driven signal was withdrawn. It shall be understood that the "braking" described in various embodiments of the present invention refers to an action of decelerating, slowing, reducing, or stopping, gradually or substantially, the level of vibration of a haptic vibrator. During the course of braking, the level of vibration is substantially reduced to almost or close to zero.

FIG. 1 depicts a prior art haptic driving signal without braking and an acceleration for a haptic vibrator driven by the haptic driving signal without braking. As shown in FIG. 1, after the haptic driven signal 110 withdrawn, the acceleration curve 120 for haptic vibrator shows that the vibrator still vibrates for a period around 80 ms. For applications desiring short haptic vibration, e.g. device haptic confirmation for user touch, such a long free vibration may severely dilute user haptic experience.

Figure 2:
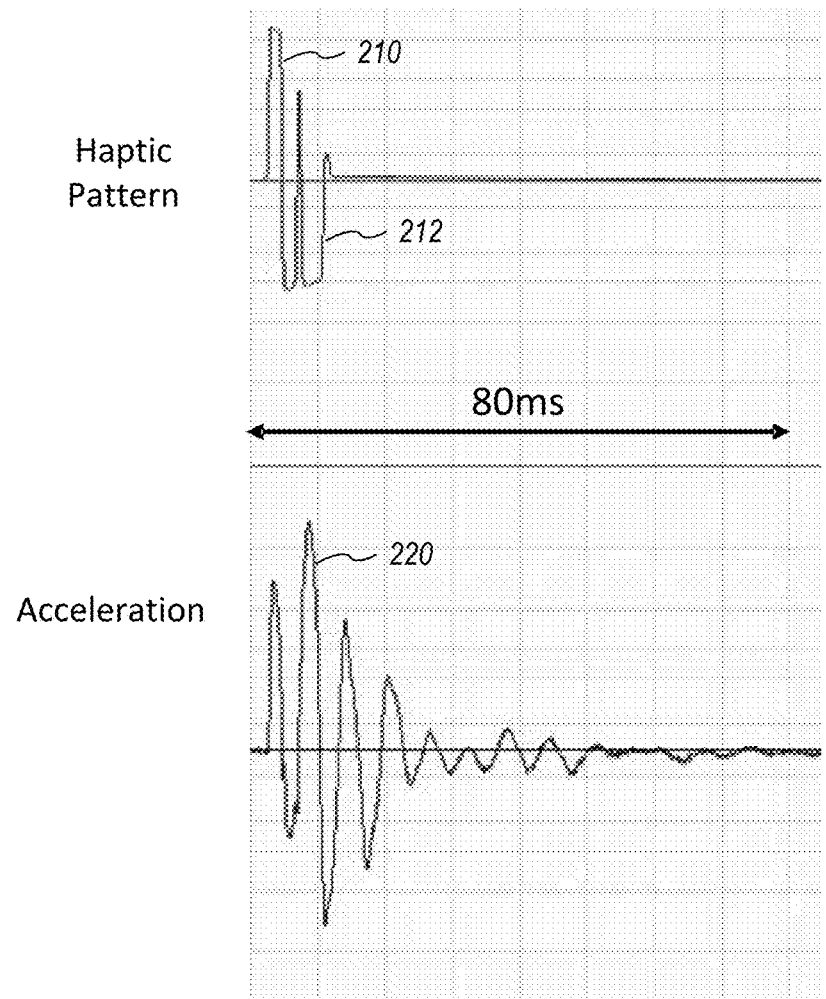
FIG. 2 depicts a prior art haptic driving signal with braking and an acceleration for a haptic vibrator driven by the haptic pattern with braking.

The free oscillation period may be decreased by applying some kinds of braking that stops the free oscillation. Such an active braking process is currently deployed in many electronic devices. FIG. 2 depicts a prior art haptic driving signal 210 incorporating a braking section 212 and an acceleration 220 for a haptic vibrator driven by the haptic pattern with braking. Compared to the acceleration 120 shown in FIG. 1, the acceleration 220 has the free oscillation period reduced to around 50 ms.

Figure 3:
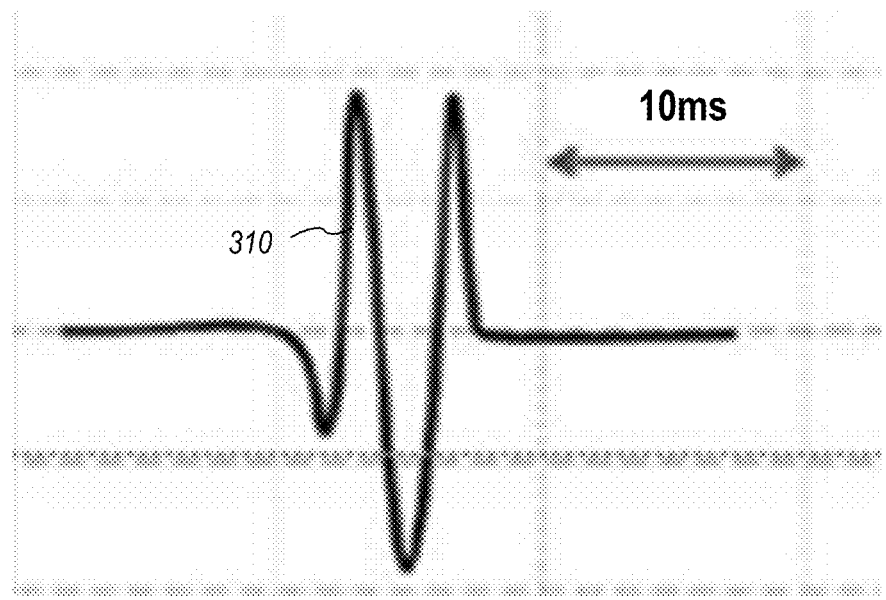
FIG. 3 depicts an exemplary desired acceleration pattern for a certain application in an electronic device.

Some applications may require a very short haptic vibration period. FIG. 3 depicts an exemplary desired acceleration pattern 310 for a certain application in an electronic device. The overall haptic vibration period in acceleration pattern 310 is around 10 ms. Such a short vibration period requires that the free oscillation shall be stopped as soon as possible. Accordingly, the vibration braking part in a haptic driving signal needs to be optimized for such a requirement.

Figure 4:
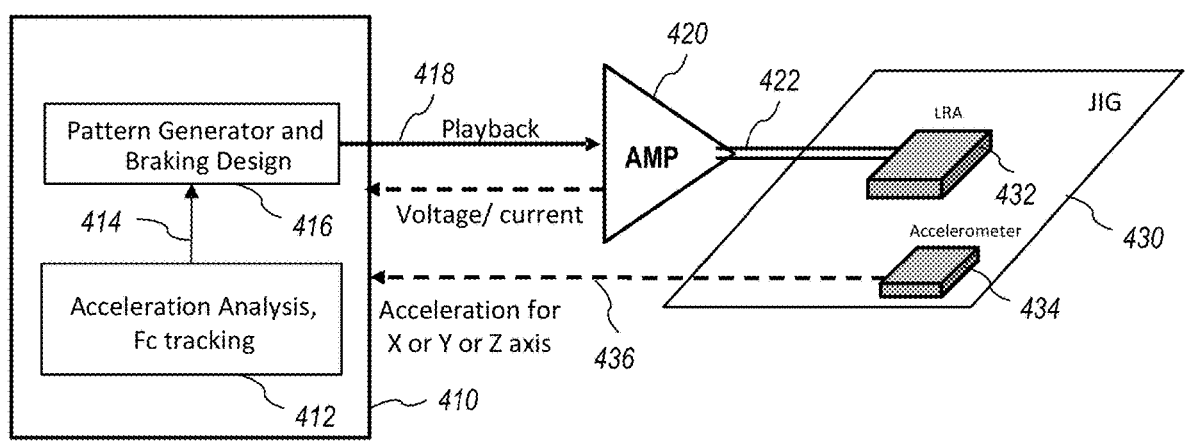
FIG. 4 depicts a block diagram for a vibration braking optimization system for haptic vibration according to various embodiments of the invention.

FIG. 4 depicts a block diagram for a vibration braking optimization system 400 for haptic vibration according to various embodiments of the invention. The system provides a way to generate an optimized haptic driven signal offline for vibration braking to achieve quick free oscillation diminishment. The vibration braking optimization system 400 comprises a test apparatus or circuit 430 incorporating a haptic vibrator 432 and a vibration sensor 434 (e.g. an accelerometer), an amplifier 420, and a pattern generator 410. The pattern generator 410 incorporates a pattern and braking generation module 416 and an acceleration analysis module 412. The pattern and braking generation module 416 outputs a pattern signal 418 to the amplifier 420, which generates a driven signal 422 to drive the haptic vibrator 432. The accelerometer 434 measures acceleration induced by vibration from the haptic vibrator 432 and outputs an acceleration signal 436 to the acceleration analysis module 412, which performs acceleration analysis and/or resonant frequency (Fc) tracking based on the acceleration signal 436 and outputs a feedback control signal 414 to the pattern and braking generation module 416 for adjusting the pattern signal 418. Such a closed-loop vibration braking optimization system 400 may be operated in various processes to achieve an optimal vibration braking scheme for quickest free oscillation braking. Although acceleration is used to represent a level of vibration in one or more embodiments of the present invention, it shall be understood that various other indicators, e.g. displacement, may also be used to parameterize the level of vibration. Other types of vibration sensor, e.g. a displacement sensor, may also be applicable for braking optimization using the disclosed vibration reduction embodiments. Such variation shall still be within the scope of this invention.

In one or more embodiments, the acceleration signal 436 may be an acceleration for X, Y, Z axis, or an overall acceleration combined from accelerations along different axes.

In one or more embodiments, the test apparatus or circuit 430 is a jig or device configured for offline braking testing for the haptic vibrator 432.

In one or more embodiments, haptic vibrator 432 may be a LRA, an ERM actuator, or other types of vibration actuator with sensible free oscillation after vibration driven signal withdrawn.

It shall be understood that the haptic pattern generation module 410 may be a standalone apparatus or as a component of apparatus. The haptic pattern generation module 410 may further comprise additional components, e.g. a digital/analog converter (DAC), one or more microprocessors, storage, I/O interface, etc. The pattern and braking generation module 416 may comprise a digital synthesizer to synthesize a desired digital signal according to the feedback control signal 414, and a DAC to convert the digital signal into the analog pattern signal 418, which is amplifier by the amplifier 420 to generate the driven signal 422.

Figure 5:
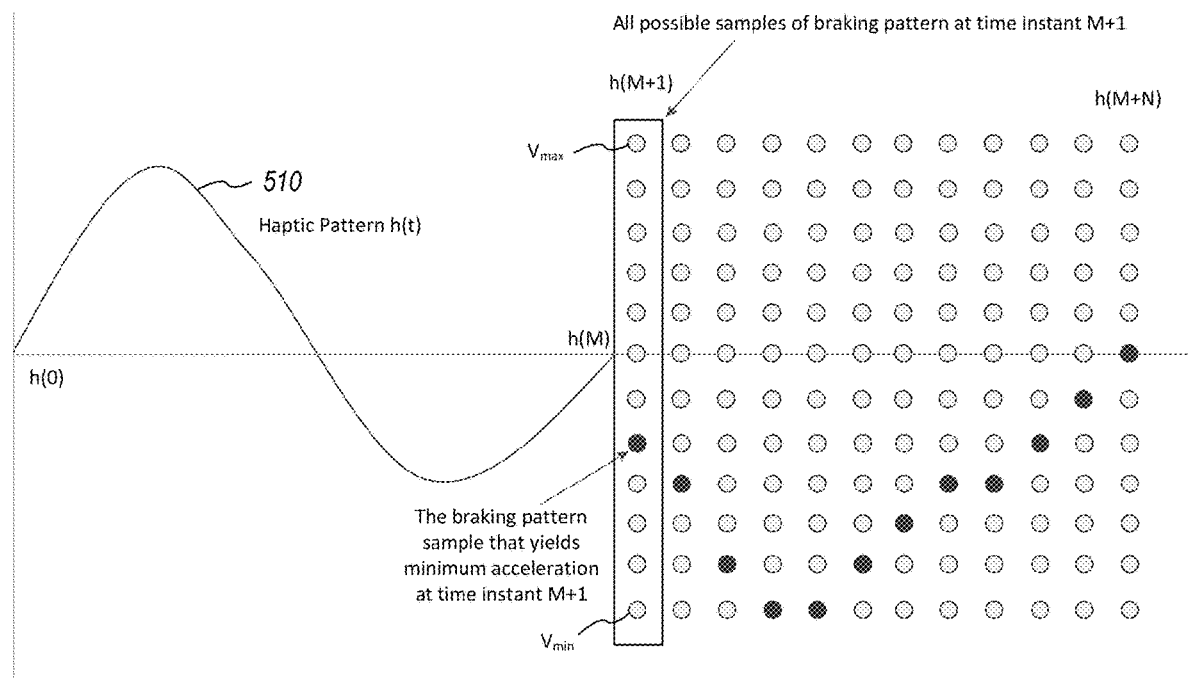
FIG. 5 depicts a diagram for real-time braking pattern generation according to various embodiments of the invention.

FIG. 5 depicts a diagram for real-time braking pattern generation according to various embodiments of the invention. A pattern signal h(t) 510 is used to cause a haptic vibrator to vibrate. After a desired period, the pattern and braking generation module 416 starts to initiate a vibration braking at time frame M. At next time frame M+1, the amplitude, e.g. voltage, of the pattern signal h(t) is identified from a plurality of potential values between a minimum value $V_{min}$ and a maximum value $V_{max}$. The number of values depends on various parameters, e.g. the precisions of the DAC, etc. In one or embodiments, the pattern and braking generation module 416 tries each potential value given the pattern signal h(t) up to time frame M. Accelerations measured for each potential values are recorded and compared. Amplitude corresponding to the minimum acceleration measured is selected as the amplitude for the time frame M+1. Afterwards, the braking pattern generation moves to next time frame M+2 and repeats the same procedures for potential value trial given the pattern signal h(t) up to time frame M+1, acceleration measurement and comparison, identification for selected amplitude for time frame M+2, until time frame M+N, where the minimum acceleration is below a threshold or as zero.

Figure 6:
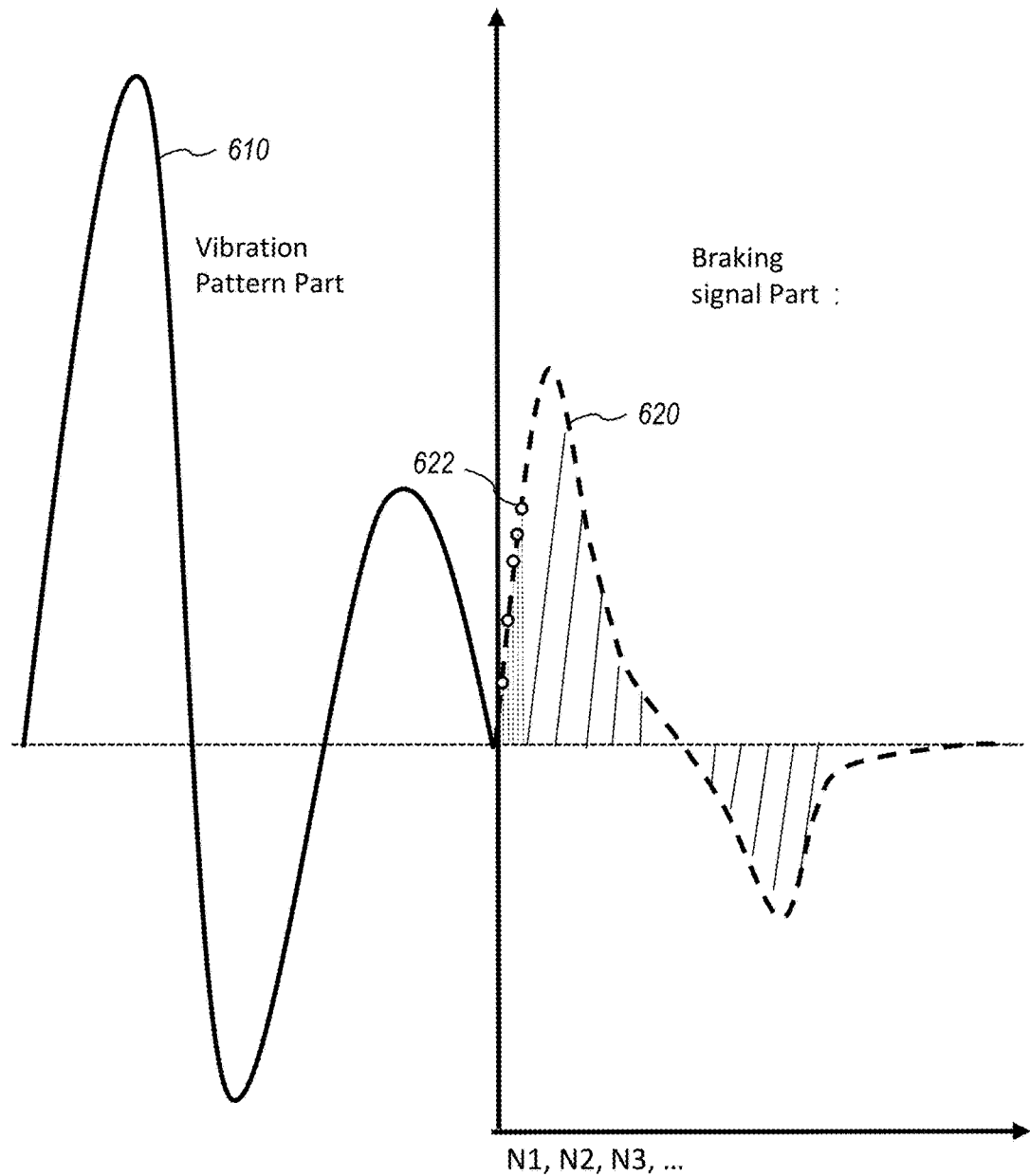
FIG. 6 depicts a haptic driving signal comprising a vibration pattern and a braking signal part according to various embodiments of the invention.

FIG. 6 depicts an exemplary haptic driving signal comprising a vibration pattern part 610 and a braking signal part 620 according to various embodiments of the invention. The amplitude or voltage level 622 for the braking signal part 620 at each time frame N1, N2 . . . may be obtained using a braking pattern generation process shown in FIG. 7.

Figure 7:
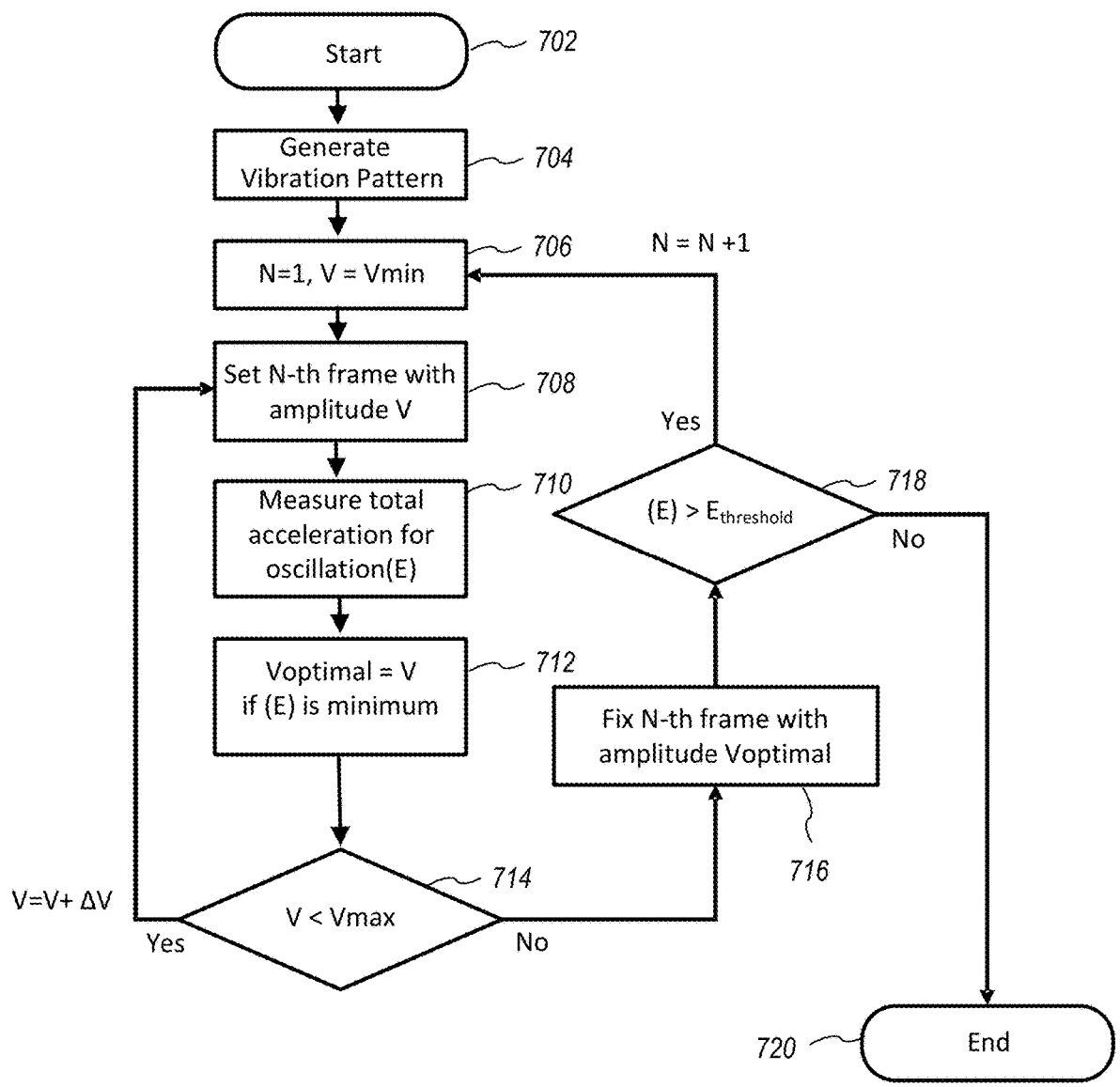
FIG. 7 depicts a flow process of optimized braking generation for a haptic vibrator according to various embodiments of the invention.

FIG. 7 depicts a flow process of optimized braking generation for a haptic vibrator according to various embodiments of the invention. The process may be done using the vibration braking optimization system 400 shown in FIG. 4. After the process starts in step 702, a vibration pattern signal is generated in step 704 to cause the haptic vibrator to vibrate. In step 706, after a desired period, the pattern and braking generation module 416 starts to initiate a vibration braking at a braking start time frame, with a frame counter N initially set as 1 and an amplitude V for the vibration pattern signal at the braking start time frame initially set as the minimum voltage $V_{min}$. In step 708, the brake signal at the N-frame is set with amplitude V and applied to the haptic vibrator. Acceleration (E) induced by vibrator is measured in step 710. If the measured acceleration (E) is a minimum value, the amplitude V is set in step 712 as the optimal voltage $V_{optimal}$. Initially, the acceleration (E) measured at the braking start time frame (N=1) is set as the minimum value. A comparison is then implemented in step 714 to verify whether the voltage V less than a maximum voltage $V_{max}$. If yes, the process goes back to step 708 after the amplitude V is increase by a step size "$\Delta V$" (which corresponds to "1" for next step in digital domain). If the V reaches the maximum voltage $V_{max}$, the process goes to step 716 with the N-th frame fixed with the amplitude as the optimal voltage $V_{optimal}$. Afterwards, another comparison is implemented in step 718 to verify whether the minimum acceleration is still above a threshold. In one or more embodiments, the threshold is set as 0 or a level of sensor noise. If yes, the process goes back to step 706 for next time frame (N+1). In response to the threshold is reached, the process goes to step 720 to end the vibration braking.

Although FIG. 7 is shown with the exemplary flow process of optimized braking generation for minimizing acceleration, it is understood that various modification may be applied for the flow process. The modification may include excluding certain steps and/or adding additional steps, parallel steps, different step sequence arrangements, etc. Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Figure 8:
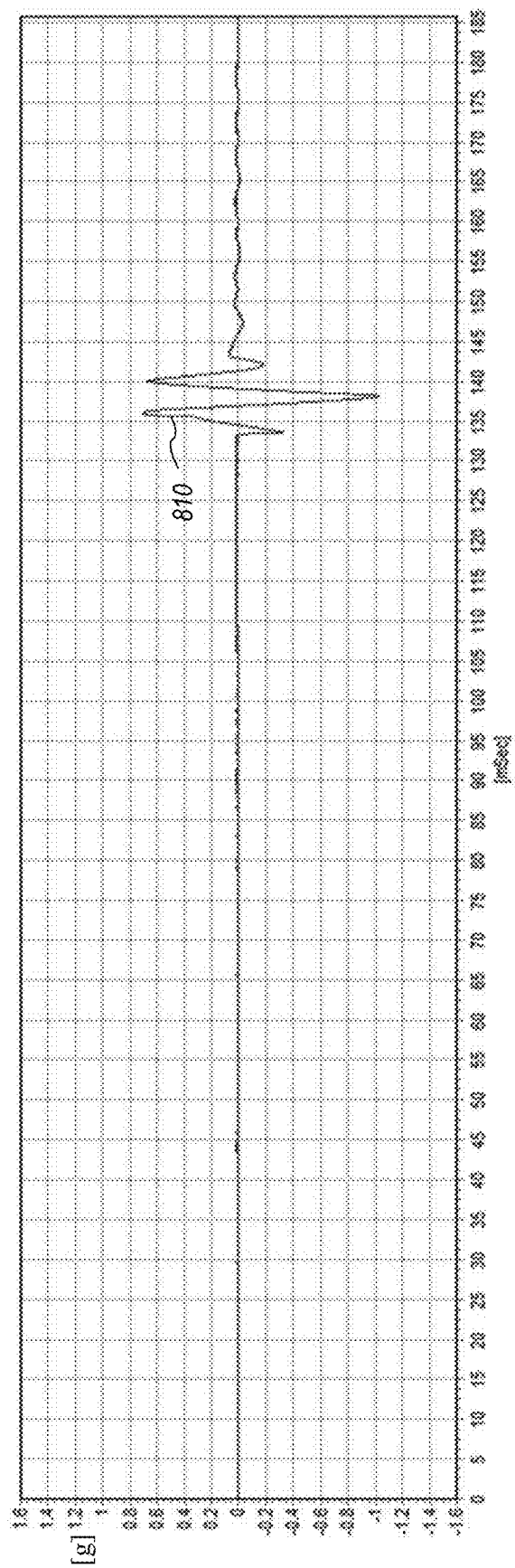
FIG. 8 depicts an acceleration pattern generated via an optimized braking process according to various embodiments of the invention.

FIG. 8 depicts an acceleration pattern generated via an optimized braking process according to various embodiments of the invention. The X-axis is time in milliseconds and Y-axis is acceleration in g-force (1.0=9.8 m/s$^2$). It may be seen that the acceleration pattern 810 is very close to the desired acceleration pattern 310 shown in FIG. 3. The acceleration pattern 810 demonstrates the effectiveness of the optimized vibration braking method.

In one or more embodiments, after obtaining an optimized vibration braking pattern for a haptic vibrator, the braking pattern may be stored or loaded into a storage of an electronic device, within which the haptic vibrator is integrated. Depending on application running, the electronic device may utilize the optimized vibration braking pattern, with or without additional tuning, for enhanced user haptic feedback experience.

In one or more embodiments, for certain applications not requiring optimal vibration braking for a haptic vibrator, the electronic device may tune down the optimized vibration braking pattern by a desired scaling parameter to achieve a "softer" braking for desired haptic feedback. In one or more embodiments, the scaling parameter may be predetermined and stored within a storage of the electronic device.

One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

The invention claimed is:

1. A system for haptic vibration braking, the system comprising:
    a haptic vibrator;
    a vibration sensor coupled to the haptic vibrator for measuring vibration generated by the haptic vibrator; and
    a pattern generator coupled to the haptic vibrator, the pattern generator outputs a pattern signal for driving the haptic vibrator, the pattern signal at one or more time frames brakes the haptic vibrator from vibration, the pattern signal, at each of the one or more time frames, has an amplitude selected from a plurality of values based on measured vibrations corresponding to the plurality of values, given the pattern signal up to a last time frame with respect to the each of the one or more time frames.

2. The system of claim 1 wherein the haptic vibrator is a linear resonant actuator.

3. The system of claim 2 wherein the vibration sensor is an accelerometer configured to measure acceleration in one or more axes.

4. The system of claim 1 wherein the amplitude of the pattern signal at each of the one or more time frames is selected from one value among the plurality of values corresponding to a minimum vibration.

5. The system of claim 4 wherein the selected amplitudes of the pattern signals at the one or more time frames are stored in a non-transitory computer readable medium.

6. The system of claim 1 wherein the pattern signal lasts until the vibration generated by the haptic vibrator is below a threshold.

7. The system of claim 1 further comprising:
    an acceleration analysis module coupled to the vibration sensor to perform at least one of vibration analysis and resonant frequency (Fc) tracking based on the measured vibrations and output a feedback control signal to the pattern generator for adjusting the pattern signal.

8. A method for haptic vibration braking, the method comprising:
    outputting, from a pattern generator, a pattern signal to drive a haptic vibrator, the pattern signal at one or more time frames brakes the haptic vibrator from vibration;
    measuring, using a vibration sensor coupled to the haptic vibrator, vibration generated by the haptic vibrator; and
    selecting, at each of the one or more time frames, an amplitude for the pattern signal from a plurality of values based on measured vibrations corresponding to the plurality of values given the pattern signal up to a last time frame with respect to the each of the one or more time frames.

9. The method of claim 8, where the amplitude for the pattern signal is selected at each of the one or more time frames from a plurality of values corresponding to a minimum vibration.

10. The method of claim 9 further comprising:
    storing the selected amplitudes of the pattern signal at the one or more time frames in a non-transitory storage.

11. The method of claim 10 further comprising:
    storing a scaling parameter for the selected amplitudes of the pattern signal at the one or more time frames in the non-transitory storage, the scaling parameter is used to tune down the pattern signal for desired haptic feedback.

12. The method of claim 8 wherein the pattern signal lasts until the vibration generated by the haptic vibrator is below a threshold.

13. The method of claim 8 wherein the haptic vibrator is a linear resonant actuator.

14. The method of claim 8 wherein the vibration sensor is an accelerometer configured to measure acceleration in one or more axes.

15. A method for haptic vibration braking, the method comprising:
    at a current time frame, applying a pattern signal, output from a pattern generator, to a haptic vibrator for vibration braking while the haptic vibrator is vibrating;
    iteratively setting an amplitude of the pattern signal at the current time frame to a plurality of potential values;
    obtaining, using a vibration sensor coupled to the haptic vibrator, a plurality of vibration measurements generated by the haptic vibrator at the current time frame corresponding to the plurality of potential values;
    selecting a value among the plurality of potential values as an optimal amplitude of the pattern signal at the current time frame, the selected value corresponds to a minimum vibration measured among the plurality of vibration measurements; and
    applying the optimal amplitude of the pattern signal at the current time frame and repeating above steps to iteratively obtain an optimal amplitude of the pattern signal at each subsequent one or more time frames, until the haptic vibrator has a vibration below a threshold.

16. The method of claim 15 wherein the plurality of potential values are within a range between a minimum value and a maximum value for the pattern signal.

17. The method of claim 15 further comprising:
    storing the optimal amplitude of the pattern signal at each time frame in a non-transitory storage.

18. The method of claim 17 further comprising:
    storing a scaling parameter for the optimal amplitude of the pattern signal at each time frame in a non-transitory storage, the scaling parameter is used to tune down the pattern signal for desired haptic feedback.

19. The method of claim 15 wherein the haptic vibrator is a linear resonant actuator.

20. The method of claim 15 wherein the vibration sensor is an accelerometer configured to measure acceleration in one or more axes.

* * * * *